(12) United States Patent
Kendrick et al.

(10) Patent No.: US 11,815,714 B2
(45) Date of Patent: Nov. 14, 2023

(54) PHOTONIC INTEGRATED CIRCUIT-BASED IMAGING SYSTEMS

(71) Applicant: Raytheon Company, Waltham, MA (US)

(72) Inventors: Richard L. Kendrick, San Mateo, CA (US); Joseph Marron, Manhattan Beach, CA (US); Stephen P. Palese, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/654,204

(22) Filed: Mar. 9, 2022

(65) Prior Publication Data

US 2023/0288634 A1    Sep. 14, 2023

(51) Int. Cl.
*G02B 6/12* (2006.01)
*G02B 6/13* (2006.01)

(52) U.S. Cl.
CPC ..... *G02B 6/12007* (2013.01); *G02B 6/12004* (2013.01); *G02B 6/13* (2013.01); *G02B 2006/12138* (2013.01)

(58) Field of Classification Search
None
See application file for complete search history.

(56) References Cited

U.S. PATENT DOCUMENTS

| | | | |
|---|---|---|---|
| 7,187,815 B1 * | 3/2007 | Sweatt | G02B 3/0012 385/12 |
| 10,731,964 B2 | 8/2020 | Lane et al. | |
| 2017/0357055 A1 * | 12/2017 | Spector | G02B 6/122 |

OTHER PUBLICATIONS

Su et al., "Interferometric imaging using Si3N4 photonic integrated circuits for a SPIDER imager," Optics Express 12801, vol. 26, No. 10, May 2018, 12 pages.

* cited by examiner

*Primary Examiner* — Chad H Smith

(57) ABSTRACT

An apparatus includes a photonic integrated circuit having a first lenslet array and a first antenna element array forming a first pupil of the photonic integrated circuit and a second lenslet array and a second antenna element array forming a second pupil of the photonic integrated circuit, where the second pupil has a different size than the first pupil. The photonic integrated circuit also has a waveguide layer positioned between the first and second pupils, where the waveguide layer includes multiple waveguides configured to guide optical signals between antenna elements of the first antenna element array and antenna elements of the second antenna element array.

20 Claims, 8 Drawing Sheets

PHOTONIC INTEGRATED CIRCUIT-BASED IMAGING SYSTEMS

TECHNICAL FIELD

This disclosure relates generally to optical systems. More specifically, this disclosure relates to photonic integrated circuit-based imaging systems.

BACKGROUND

Optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals. Photonic integrated circuit-based optical phased arrays are currently being investigated for use in laser-based communication systems and other optical communication systems.

SUMMARY

This disclosure relates to photonic integrated circuit-based imaging systems.

In a first embodiment, an apparatus includes a photonic integrated circuit having a first lenslet array and a first antenna element array forming a first pupil of the photonic integrated circuit and a second lenslet array and a second antenna element array forming a second pupil of the photonic integrated circuit, where the second pupil has a different size than the first pupil. The photonic integrated circuit also has a waveguide layer positioned between the first and second pupils, where the waveguide layer includes multiple waveguides configured to guide optical signals between antenna elements of the first antenna element array and antenna elements of the second antenna element array.

In a second embodiment, a method includes receiving optical signals at a first lenslet array and a first antenna element array forming a first pupil of a photonic integrated circuit. The method also includes transmitting the optical signals from a second lenslet array and a second antenna element array forming a second pupil of the photonic integrated circuit, where the second pupil has a different size than the first pupil. The method further includes guiding the optical signals between antenna elements of the first antenna element array and antenna elements of the second antenna element array using multiple waveguides of a waveguide layer positioned between the first and second pupils.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
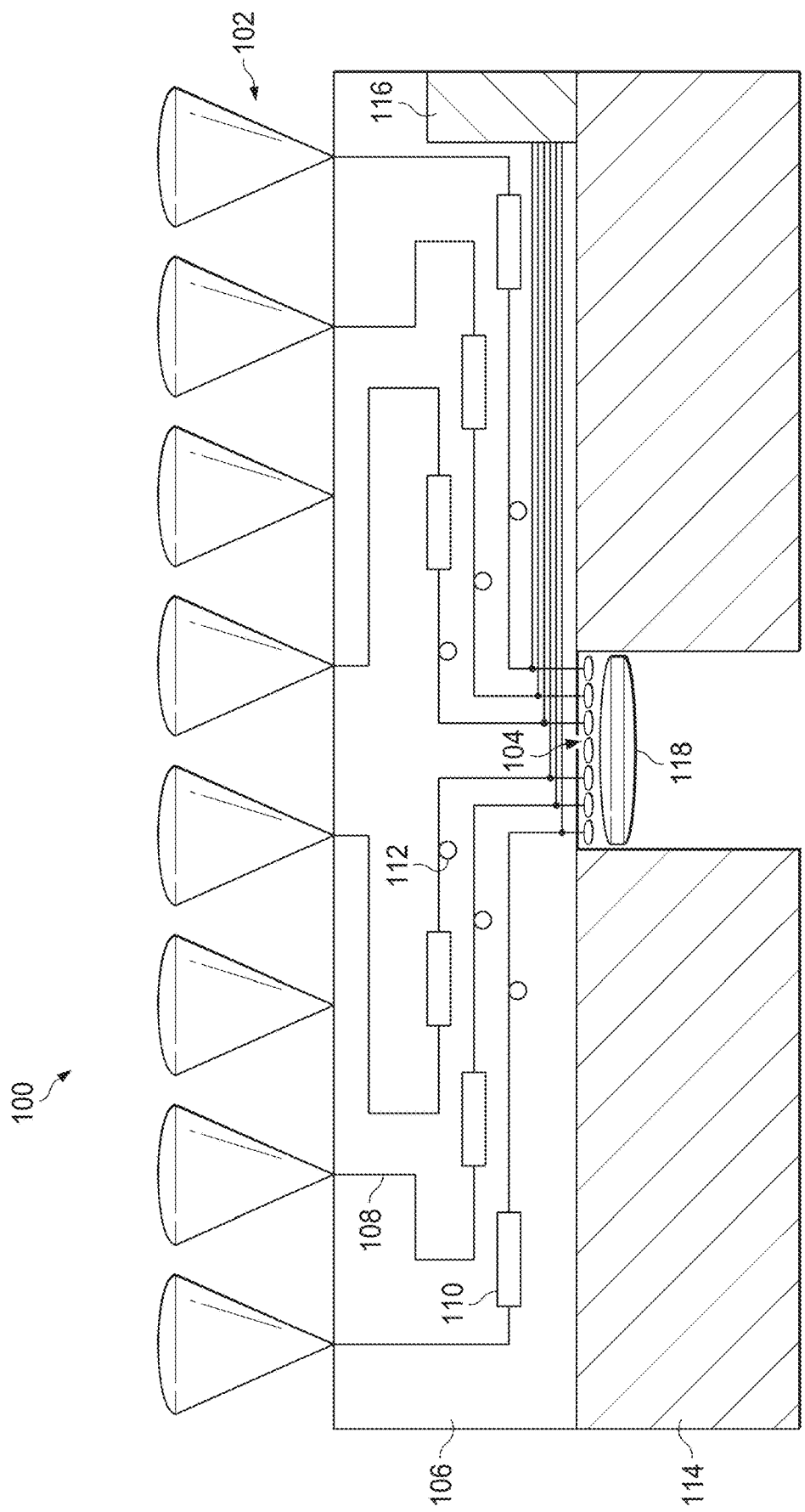
FIG. 1 illustrates an example photonic integrated circuit-based imaging system according to this disclosure.

FIGS. 1 through 10, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals. Photonic integrated circuit-based optical phased arrays are currently being investigated for use in laser-based communication systems and other optical communication systems.

This disclosure provides various photonic integrated circuit-based imaging systems, which use photonic integrated circuits to help capture images of targets or scenes. As described in more detail below, each photonic integrated circuit-based imaging system uses a photonic integrated circuit having a first array of lenslets, which refer to very small lenses. These lenslets are used to couple optical signals into a first antenna element array, which includes a number of nano-antennas or other antennas associated with the first array of lenslets. The first array of lenslets and the first antenna element array thereby form an entrance pupil. Waveguides are used in the photonic integrated circuit to guide the optical signals, and the optical signals can optionally be modified using components such as wavelength selection devices. The optical signals are provided to a second antenna element array associated with a second array of lenslets, which allows the optical signals to be transmitted from the second array of lenslets. The second array of lenslets and the second antenna element array thereby form an exit pupil, which has a different size than the entrance pupil. Path lengths for the optical signals as defined by the waveguides can be closely matched, such as by using path length matching devices along the waveguides to compensate for differences caused by fabrication tolerances.

One or more detectors can be used to sense or measure one or more characteristics of the optical signals transmitted through the exit pupil, and the detector(s) can generate signal values that are processed or otherwise used to generate images of targets or scenes. For example, in some cases, individual detectors can be coupled directly to the exit pupil, such as when photo-multiplier tube (PMT) detectors or avalanche photo-diode (APD) detectors are used in image plane-relayed systems. In other cases, the exit pupil can be Fourier-transformed to create an image on a traditional focal plane assembly or other imaging sensor, such as in entrance aperture imager applications where the exit pupil of the photonic integrated circuit represents an entrance aperture of the imager. Also, in some cases, an on-PIC laser or other local oscillator (LO) source may be provided and used to support functions such as on-PIC heterodyne detection.

These photonic integrated circuit-based imaging systems can have various benefits or advantages depending on the implementation. For example, the photonic integrated circuit-based imaging systems may be implemented as low-profile systems, which means that the imaging systems can be implemented having relatively-low heights (compared to conventional imaging systems). This can greatly reduce the size, weight, power, and cost (SWaP-C) of an overall system, such as by reducing the volume of the imaging system by a factor of ten or more. Also, these photonic integrated circuit-based imaging systems may be used with a wide range of apertures, including non-traditional apertures. In addition, these photonic integrated circuit-based imaging systems may be fabricated using conventional manufacturing techniques, such as complementary metal oxide semiconductor (CMOS) fabrication techniques. This can help to reduce the time and costs associated with manufacturing the photonic integrated circuit-based imaging systems.

Note that the photonic integrated circuit-based imaging systems may be used in a wide variety of applications. For example, the photonic integrated circuit-based imaging systems may be used for commercial or defense-related imaging, such as when used with aircraft (like airplanes or drones) or satellites for information gathering or when used in guided missiles for targeting. The photonic integrated circuit-based imaging systems may also be used to support image capture operations in consumer devices, such as when used in mobile smartphones, tablet computers, laptop computers, or digital cameras. The photonic integrated circuit-based imaging systems may further be used in laser detection and ranging (LADAR) applications. In general, the photonic integrated circuit-based imaging systems described in this patent document may be used to perform any suitable imaging function(s) in any suitable system(s) for any suitable purpose(s). While example uses and applications are provided below, these are for illustration only and do not limit the scope of this disclosure.

FIG. 1 illustrates an example photonic integrated circuit-based imaging system 100 according to this disclosure. As shown in FIG. 1, the photonic integrated circuit-based imaging system 100 includes a first pupil 102 and a second pupil 104. Each pupil 102, 104 represents a collection or array of lenslets and associated antenna elements used to transmit or receive optical signals. As can be seen in FIG. 1, the first pupil 102 has a larger size (such as a larger diameter) than the second pupil 104. The relative size difference between the pupils 102, 104 can vary as needed or desired. In some cases, for instance, the first pupil 102 may have a diameter than is eight to ten times larger than the diameter of the second pupil 104, although each pupil 102, 104 may have any suitable size, shape, and dimensions. Note that the first and second pupils 102, 104 may contain the same number of lenslets and the same number of antenna elements, although each pupil 102, 104 may have any suitable number of lenslets and any suitable number of antenna elements. Depending on the implementation, the pupil 102 may represent the entrance pupil and the pupil 104 may represent the exit pupil, or the pupil 104 may represent the entrance pupil and the pupil 102 may represent the exit pupil. The entrance pupil refers to the pupil that receives optical energy into the photonic integrated circuit, and the exit pupil refers to the pupil that provides optical energy from the photonic integrated circuit.

A waveguide layer 106 is positioned between the pupils 102, 104 and is used to guide optical signals between the pupils 102, 104. Again, depending on the implementation, the waveguide layer 106 may transport optical signals from the pupil 102 to the pupil 104 or from the pupil 104 to the pupil 102. In this example, the waveguide layer 106 includes various optical waveguides 108, which represent structures configured to transport optical signals. Each waveguide 108 may be formed from any suitable material(s) and in any suitable manner. For instance, each waveguide 108 may be formed using different materials having different indices of refraction so that light can be guided using internal reflection. Each waveguide 108 may also travel any suitable path through the waveguide layer 106. In general, the number of waveguides 108 and the layout of the waveguides 108 within the waveguide layer 106 can vary based on a number of factors, such as the number of antenna elements associated with each pupil 102, 104 and the layout of those antenna elements.

Note that in the example shown in FIG. 1, the waveguide layer 106 is shown as a relatively thick layer in which the waveguides 108 connect the pupils 102, 104 vertically. However, this is for ease of illustration and explanation only. In many implementations, the waveguide layer 106 would be a much thinner layer, and the waveguides 108 would predominantly travel horizontally to route optical signals between the pupils 102, 104. The vertical arrangement of the waveguide layer 106 shown in FIG. 1 is used merely to illustrate the operations of the waveguide layer 106.

At least some of the waveguides 108 include or are associated with path length matching devices 110, each of which represents a device that is configured to change the effective path length of the associated waveguide 108. One or more of the path length matching devices 110 may be adjusted to help ensure that all of the waveguides 108 have substantially the same effective path length, which can help to ensure that the optical signals transported over the waveguides 108 arrive at one of the pupils 102, 104 at substantially the same time. Among other things, the path length matching devices 110 can be used to help compensate for slightly different path lengths created due to fabrication tolerances during the manufacturing process. Each path length matching device 110 includes any suitable structure configured to alter or adjust the effective path length of an optical path, such as a thermo-optic or electro-optic device. In some embodiments, each waveguide 108 includes or is associated with a path length matching device 110.

At least some of the waveguides 108 also or alternatively include or are associated with wavelength selection devices 112, each of which represents a device that is configured to control at least one wavelength of optical energy flowing through the associated waveguide 108. For example, each wavelength selection device 112 may selectively pass or block optical signals at one or more wavelengths or within one or more wavelength bands (sometimes referred to as wavebands) or combine or separate optical signals at different wavelengths or wavelength bands. One or more of the wavelength selection devices 112 may be used to help ensure that only optical signals of certain wavelengths pass from one pupil 102, 104 to another pupil 104, 102 in the imaging system 100 or to separate/combine optical signals of different wavelengths passing from one pupil 102, 104 to another pupil 104, 102 in the imaging system 100. Each wavelength selection device 112 includes any suitable structure configured to block, pass, separate, or combine optical wavelengths, such as a micro-ring drop filter, an arrayed waveguide grating, or a dichroic splitter. In some embodiments, each waveguide 108 includes or is associated with a wavelength selection device 112.

An electronics layer 114 can be used to support various functions of the imaging system 100. For example, the electronics layer 114 may include CMOS devices or other devices configured to control the path length matching devices 110 and/or the wavelength selection devices 112 of the imaging system 100. The electronics layer 114 may also include CMOS devices or other devices configured to control a local oscillator (LO) source 116, which can generate LO signals for use in performing heterodyne detection. The electronics layer 114 includes any suitable electronic components for performing any desired function or functions related to the imaging system 100. The LO source 116 includes any suitable source of one or more LO signals, such as a laser. Note that the use of an on-PIC LO source 116 is optional and that the LO source 116 may be omitted (such as when no heterodyne detection is needed) or placed off-chip. Also note that, in this example, the electronics layer 114 may be used to define a space that surrounds the smaller pupil 104 of the photonic integrated circuit. In addition, an optional image forming lens or other lens 118 may be positioned over the lenslets of the pupil 104. The lens 118 may be used to provide any suitable image modification, such as to focus optical energy passing through the lens 118 from the lenslets of the pupil 104 onto an external structure.

The various components of the imaging system 100 shown in FIG. 1 may be formed from any suitable materials and in any suitable manner. In some embodiments, for example, the components of the imaging system 100 can be formed using CMOS fabrication techniques, although other techniques may be used to fabricate the imaging system 100. Also, the components of the imaging system 100 can be formed using a wide variety of materials depending on the implementation, such as silicon, silicon nitride, silicon dioxide, gallium nitride, gallium arsenide, or germanium.

Figure 2:
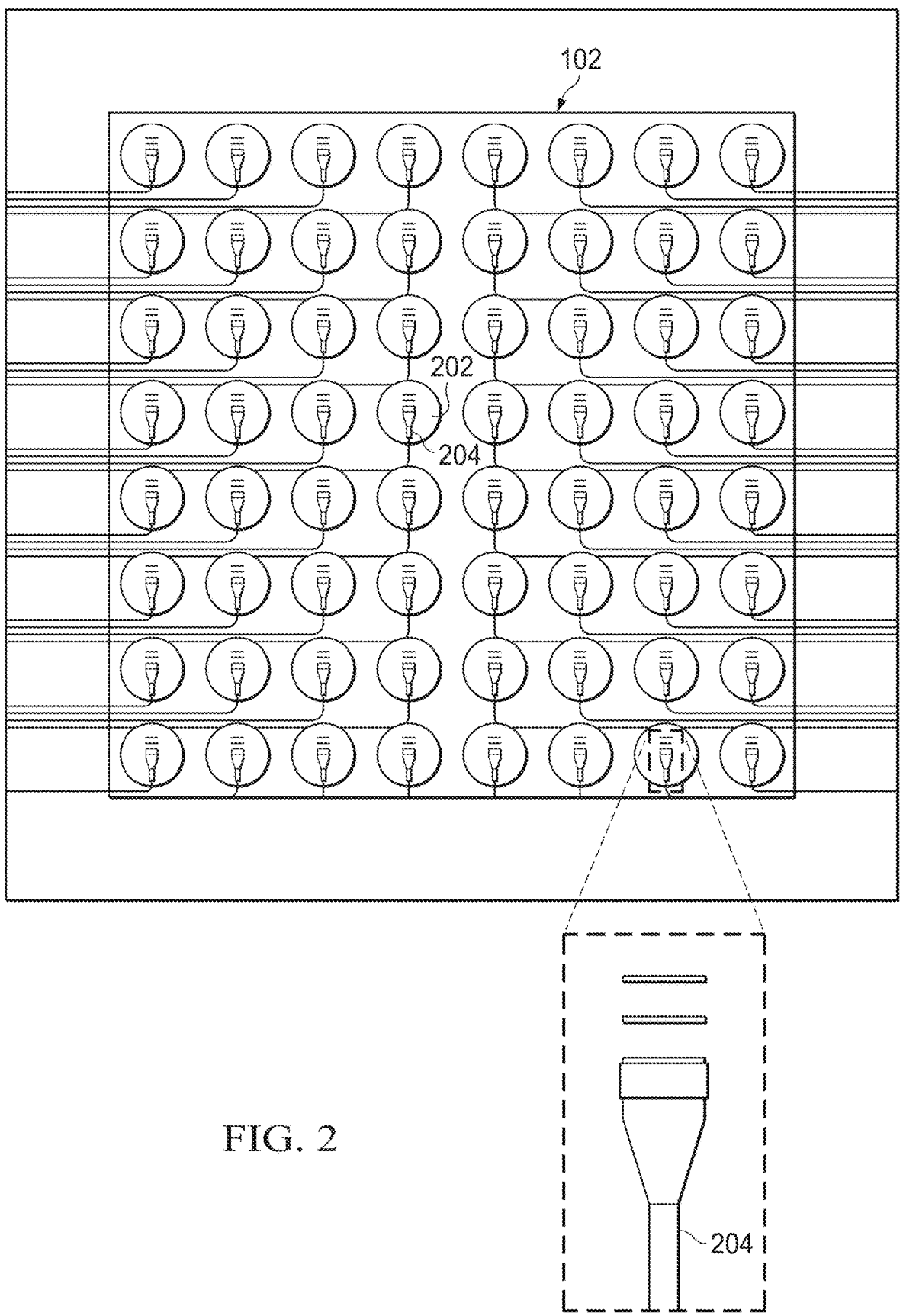
FIGS. 2 and 3 illustrate example entrance and exit pupils of the photonic integrated circuit-based imaging system shown in FIG. 1 according to this disclosure.
Figure 3:
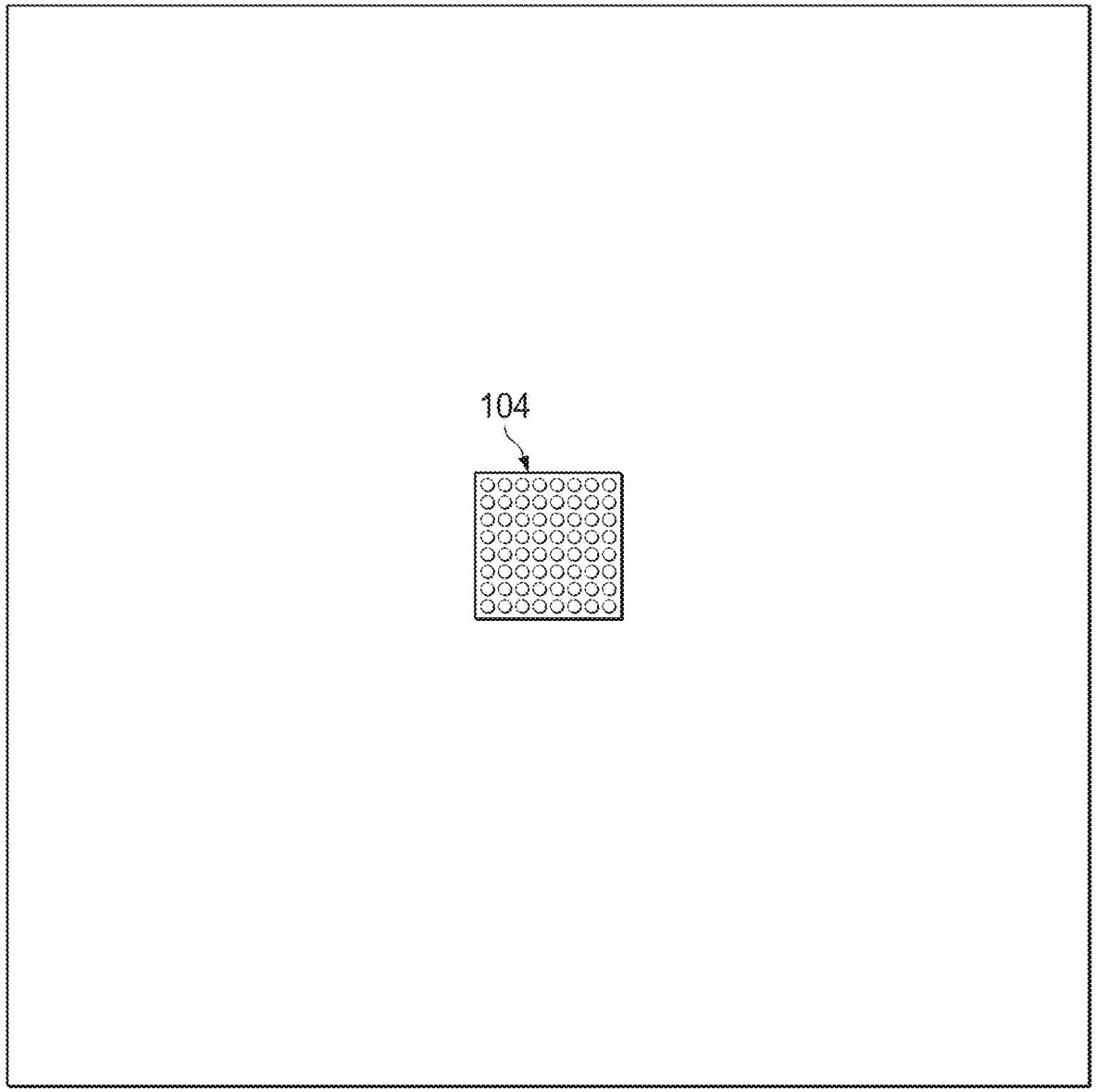

FIGS. 2 and 3 illustrate example entrance and exit pupils of the photonic integrated circuit-based imaging system 100 shown in FIG. 1 according to this disclosure. More specifically, FIG. 2 illustrates an example of the pupil 102 of the photonic integrated circuit-based imaging system 100, and FIG. 3 illustrates an example of the pupil 104 of the photonic integrated circuit-based imaging system 100. As noted above, depending on the implementation, the pupil 102 may represent the entrance or exit pupil, and the pupil 104 may represent the exit or entrance pupil. The definition of the entrance and exit pupils depends on the direction that optical signals pass through the imaging system 100.

As shown in FIG. 2, the pupil 102 includes an array of lenslets 202 associated with an array of antenna elements 204. Each lenslet 202 represents a very small lens, such as a microlens or nanolens, that can focus incoming light into the associated antenna element 204 or that can expand outgoing light from the associated antenna element 204. Each lenslet 202 may be formed from any suitable material(s) and in any suitable manner. Each lenslet 202 may also have any suitable size, shape, and dimensions. In some embodiments, for instance, each lenslet 202 may represent a convex lens. Each antenna element 204 represents a nanophotonic antenna or other antenna element that transmits and/or receives at least one optical signal. Each antenna element 204 may be formed from any suitable material(s) and in any suitable manner. Each antenna element 204 may also have any suitable size, shape, and dimensions. An enlarged view of one example embodiment of each antenna element 204 is shown in FIG. 2.

The pupil 104 shown in FIG. 3 can have the same overall design as the pupil 102, but the pupil 104 is smaller than the pupil 102. Thus, for example, the pupil 104 can include an array of lenslets (referred to as lenslets 202' below) and an array of antenna elements (referred to as antenna elements 204' below). To support the smaller size of the pupil 104, the lenslets in the pupil 104 can be smaller and/or more closely packed together compared to the lenslets 202 of the pupil 102, and/or the antenna elements in the pupil 104 can be smaller and/or more closely packed together compared to the antenna elements 204 of the pupil 102. As shown in FIGS. 2 and 3, the pupil 104 can be significantly smaller than the pupil 102, such as when the pupil 104 has an area that is $\frac{1}{16}$ to $\frac{1}{64}$ the area of the pupil 102 (although other relative sizes may be used). The imaging system 100 here generally uses the photonic integrated circuit to reduce or expand the pupil size of the imaging system 100.

In some cases, the imaging system 100 can be fabricated to have a relatively small size, such as when the photonic integrated circuit of the imaging system 100 is one or several hundred millimeters wide on each size. Given the relatively low height (profile) of the photonic integrated circuit of the imaging system 100, this can result in significant SWaP-C savings compared to conventional imaging systems. Moreover, in some cases, the photonic integrated circuit of the imaging system 100 can be fabricated using conventional CMOS materials and processing techniques, which can enable more rapid and less costly production of the imaging system 100. In addition, the imaging system 100 can generally be designed to capture images within any suitable wavelength range, such as any suitable frequency range from long infrared wavelengths to ultraviolet wavelengths.

Figure 4:
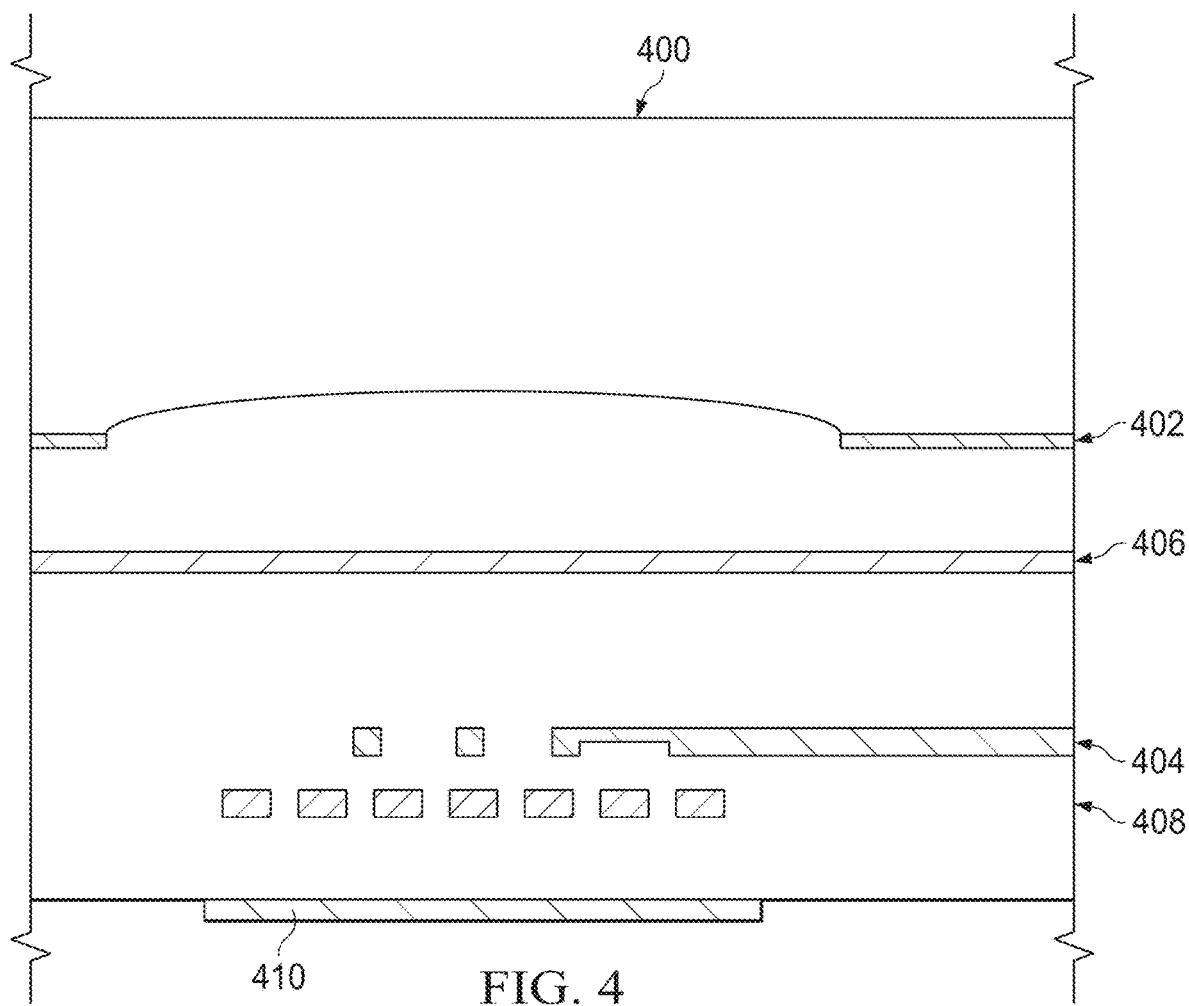
FIG. 4 illustrates an example cross-section of a portion of a photonic integrated circuit-based imaging system according to this disclosure.

FIG. 4 illustrates an example cross-section 400 of a portion of a photonic integrated circuit-based imaging system according to this disclosure. For example, the cross-section 400 shown in FIG. 4 may represent the cross-section of a portion of the pupil 102 or a portion of the pupil 104 in the photonic integrated circuit-based imaging system 100. As noted above, the pupils 102, 104 may have similar designs, but the components of the pupil 104 may be smaller and/or more closely packed together compared to the components of the pupil 102.

As shown in FIG. 4, the cross-section 400 includes a lens layer 402, which represents the layer in which lenslets of the pupil 102, 104 are formed. For example, the lens layer 402 may include the lenslets 202 of the pupil 102 or the lenslets 202' of the pupil 104. The lens layer 402 may be formed from any suitable material(s) (such as silicon) and in any suitable manner. The cross-section 400 also includes an antenna layer 404, which represents the layer in which antenna elements of the pupil 102, 104 are formed. For instance, the antenna layer 404 may include the antenna elements 204 of the pupil 102 or the antenna elements 204' of the pupil 104. The antenna layer 404 may be formed from any suitable material(s) (such as silicon) and in any suitable manner. An anti-reflection coating layer 406 may be formed between the lens layer 402 and the antenna layer 404. The anti-reflection coating layer 406 may be formed from any suitable material(s) (such as silicon nitride) and in any suitable manner. The anti-reflection coating layer 406 helps to reduce or prevent unwanted signal reflections within the photonic integrated circuit.

In some embodiments, a grating layer 408 may be positioned on the opposite side of the antenna layer 404 as the lens layer 402. With respect to reception by the antennas of the antenna layer 404, the grating layer 408 may help to increase the collection field of the pupil 102, 104 (compared to a pupil without the grating layer 408). In some cases, for example, the grating layer 408 may allow the pupil 102, 104 to have a collection field of about 10°, although other collection fields may be supported. The grating layer 408 may be formed from any suitable material(s) (such as silicon nitride) and in any suitable manner. Also, in some embodiments, a metal layer 410 may be positioned on the opposite side of the antenna layer 404 as the lens layer 402. With respect to reception by the antennas of the metal layer 410, the metal layer 410 may help to increase the overall antenna collection of the pupil 102, 104 (compared to a pupil without the metal layer 410). In some cases, for instance, the metal layer 410 may approximately double the overall collection of the pupil 102, 104, although other changes in overall collection may be supported. The metal layer 410 may be formed from any suitable material(s) (such as copper or aluminum) and in any suitable manner.

In some embodiments, the various layers 402-410 identified in FIG. 4 and described above may be separated from one another by layers of dielectric material(s) or other suitable material(s), such as silicon dioxide. Also, in some embodiments, the space above the lens layer 402 in FIG. 4 may represent a vacuum. In addition, in some embodiments, the entire structure represented in FIG. 4 by the cross-section 400 may be fabricated as a monolithic structure or a portion thereof, such as during the processing of a single silicon wafer, which can greatly simplify the manufacturing process.

Figure 5:
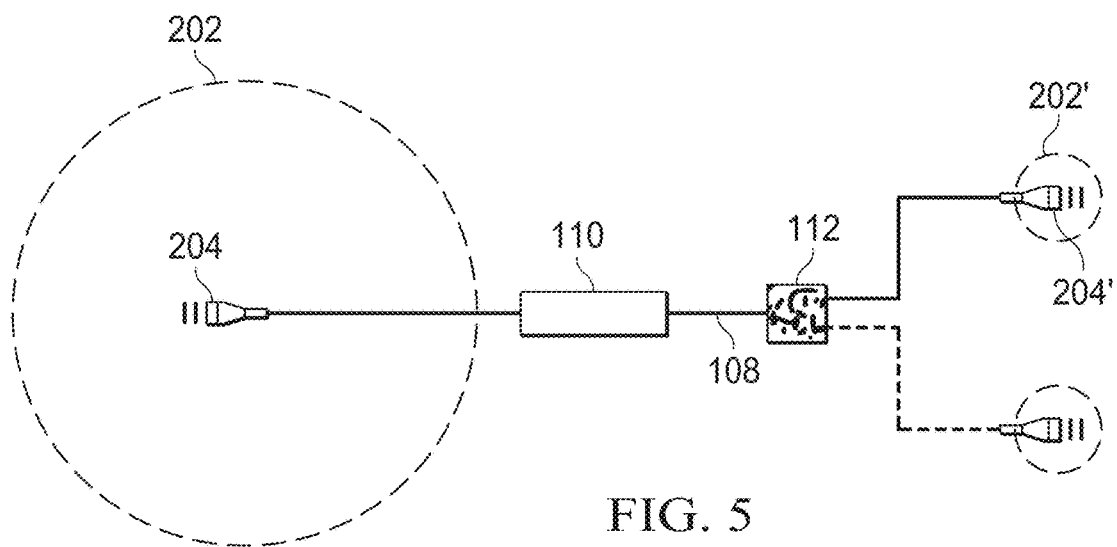
FIGS. 5 and 6 illustrate example wavelength selection devices of the photonic integrated circuit-based imaging system shown in FIG. 1 according to this disclosure.
Figure 6:
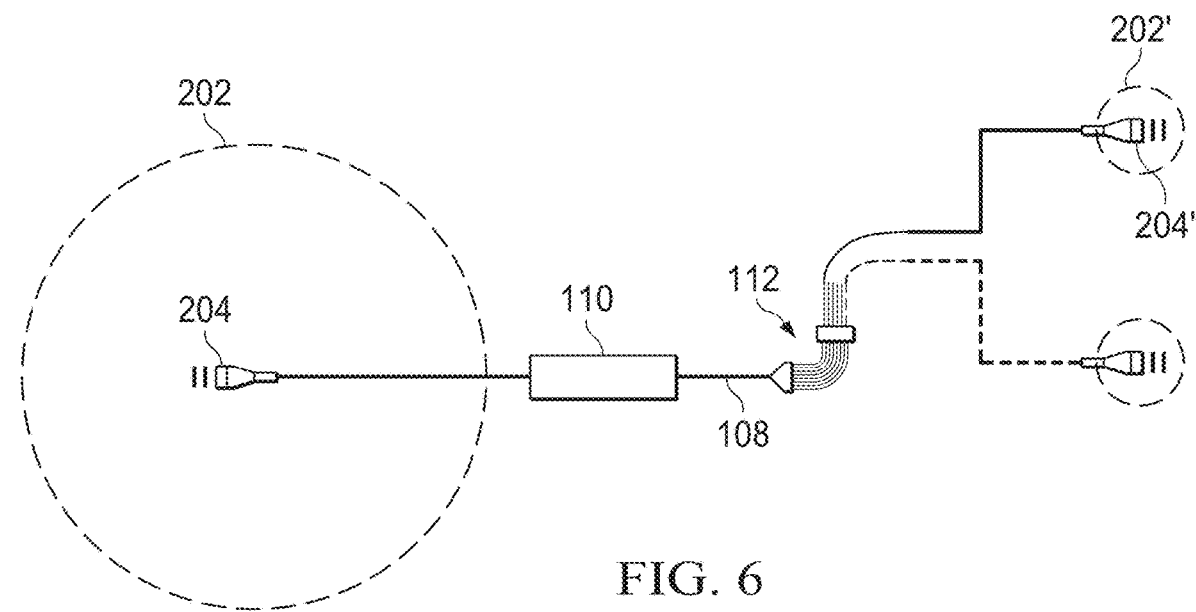

FIGS. 5 and 6 illustrate example wavelength selection devices 112 of the photonic integrated circuit-based imaging system 100 shown in FIG. 1 according to this disclosure. In the example shown in FIG. 5, the wavelength selection device 112 is positioned along a waveguide 108 (along with a path length matching device 110) between a lenslet 202 and an antenna element 204 of the pupil 102 and one or more lenslets 202' and one or more antenna elements 204' of the pupil 104. In this particular example, the wavelength selection device 112 may represent a dichroic splitter configured to split optical signals of different wavelengths or wavelength ranges onto different paths. In the example of FIG. 5, the dichroic splitter is used to allow optical signals received by each antenna element 204 of the pupil 102 to be provided to multiple antenna elements 204' of the pupil 104. This may be useful, for example, when used with a multi-wavelength imaging device. However, if imaging at only a single wavelength or wavelength range is needed, the dichroic splitter may be coupled to a single antenna element 204', and optical energy of other undesired wavelengths may be routed elsewhere or terminated in any suitable manner.

In the example shown in FIG. 6, the wavelength selection device 112 is positioned along a waveguide 108 (along with a path length matching device 110) between a lenslet 202 and an antenna element 204 of the pupil 102 and one or more lenslets 202' and one or more antenna elements 204' of the pupil 104. In this particular example, the wavelength selection device 112 may represent an arrayed waveguide grating configured to split optical signals of different wavelengths or wavelength ranges onto different paths. In the example of FIG. 6, the arrayed waveguide grating is used to allow optical signals received by each antenna element 204 of the pupil 102 to be provided to multiple antenna elements 204' of the pupil 104. Again, this may be useful when used with a multi-wavelength imaging device. However, if imaging at only a single wavelength or wavelength range is needed, the arrayed waveguide grating may be coupled to a single antenna element 204', and optical energy of other undesired wavelengths may be routed elsewhere or terminated in any suitable manner.

Although FIGS. 1 through 6 illustrate one example of a photonic integrated circuit-based imaging system 100 and related details, various changes may be made to FIGS. 1 through 6. For example, the imaging system 100 may include any suitable number of lenslets 202, 202' and antenna elements 204, 204' in any suitable arrangement within the pupils 102, 104. Also, example dimensions, materials, fabrication techniques, and other specific features or details of the imaging system 100 provided above are examples only and can easily vary as needed or desired.

Figure 7:
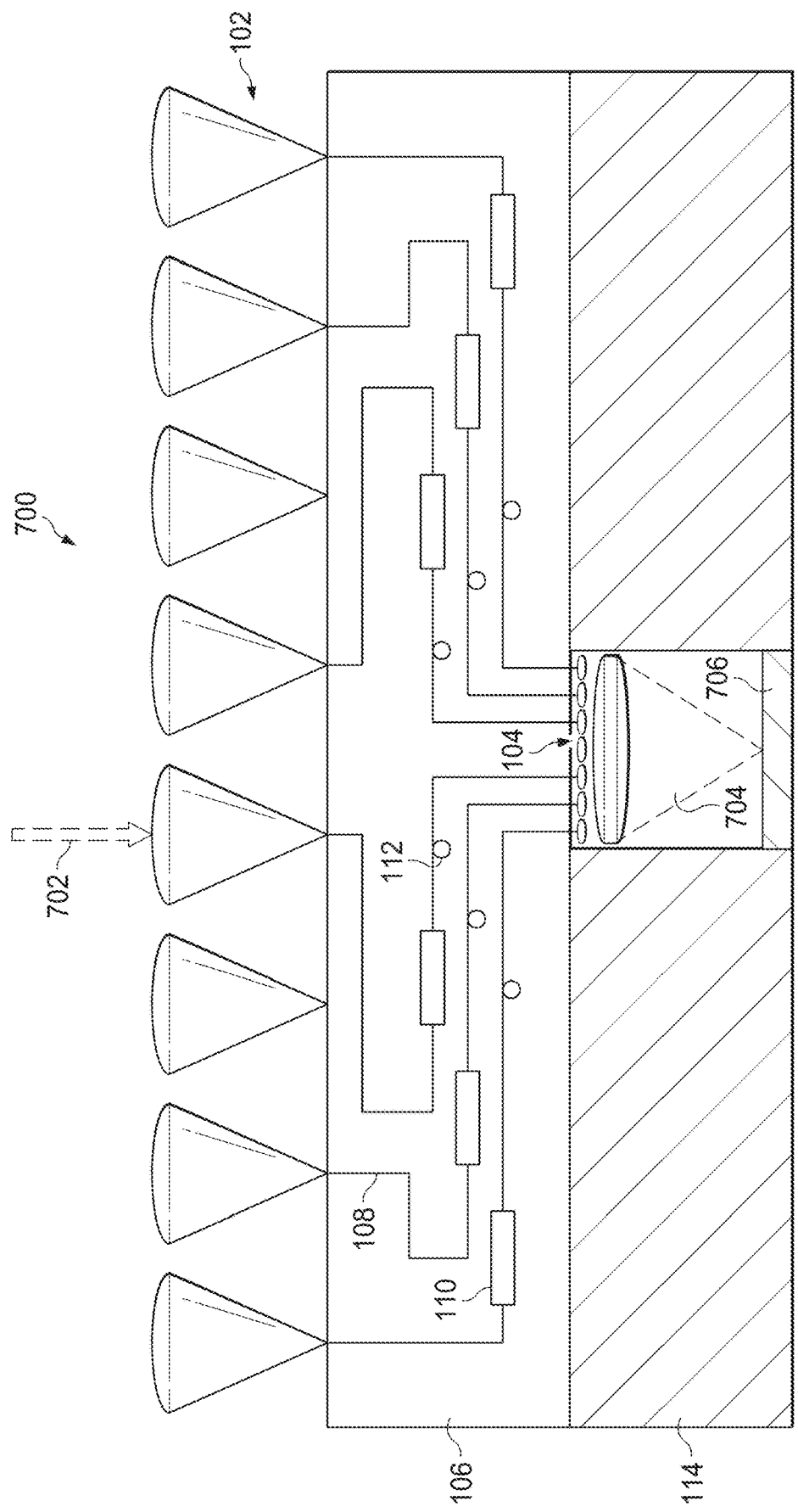
FIGS. 7 and 8 illustrate specific examples of photonic integrated circuit-based imaging systems according to this disclosure.
Figure 8:
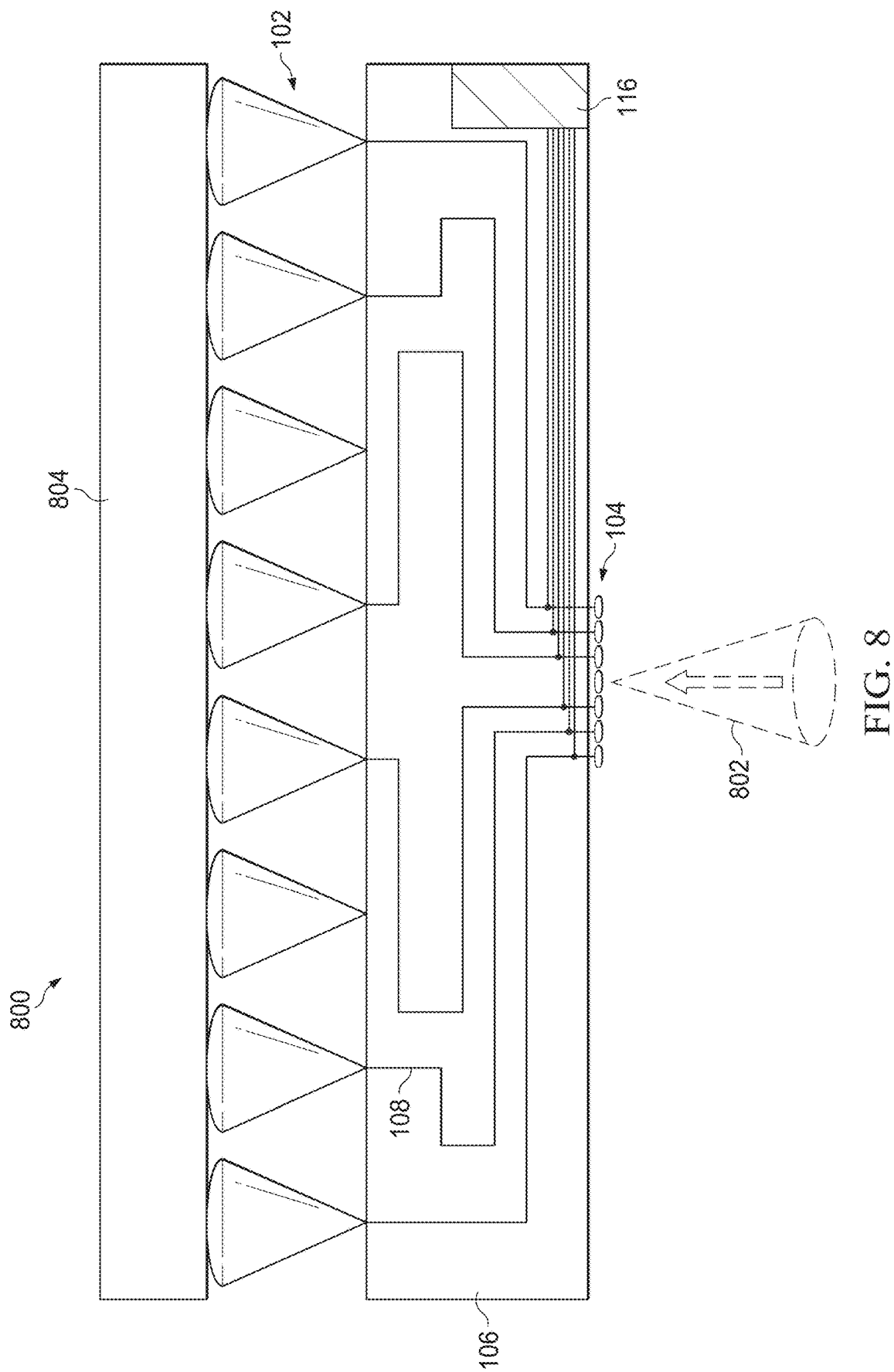

FIGS. 7 and 8 illustrate specific examples of photonic integrated circuit-based imaging systems according to this disclosure. More specifically, FIG. 7 illustrates an example passive photonic integrated circuit-based imaging system 700, and FIG. 8 illustrates an example LADAR photonic integrated circuit-based imaging system 800. Note that these photonic integrated circuit-based imaging systems represent two example implementations of the photonic integrated circuit-based imaging system 100. However, the photonic integrated circuit-based imaging system 100 may be implemented in any other suitable manner.

As shown in FIG. 7, the passive imaging system 700 receives optical energy 702 from a scene, such as optical energy reflected from a target or area of interest. The optical energy 702 is captured using the lenslets 202 and the antenna elements 204 of the pupil 102, which is the entrance pupil of the photonic integrated circuit in this example. The waveguides 108 route the associated optical signals through the waveguide layer 106 to the lenslets 202' and the antenna elements 204' of the pupil 104, which is the exit pupil of the photonic integrated circuit in this example. The path length matching devices 110 may be used to help correct for fabrication tolerances or other differences in optical path lengths, and/or the wavelength selection devices 112 may be used to provide wavelength or waveband isolation. The optical signals are provided through the pupil 104 and focused (such as by the lens 118) to form focused optical energy 704. The focused optical energy 704 is provided to an imaging device 706, such as a focal plane assembly or other imaging sensor, which can generate image data representing the scene. This allows the passive imaging system 700 to capture images of the scene as needed or desired. Note that, in particular embodiments, the lenslets 202, 202' of the pupils 102, 104 may be arranged in a Fizeau configuration or form a Fizeau interferometer, which generates an interference pattern based (among other things) the wavelengths contained in the optical energy 702.

As shown in FIG. 8, the LADAR imaging system 800 receives optical energy 802 from a scene, such as optical energy reflected from a target or area of interest. The optical energy 802 is captured using the lenslets 202' and the antenna elements 204' of the pupil 104, which is the entrance pupil of the photonic integrated circuit in this example. Mixing the received optical signals with LO signals from the LO source 116 may optionally occur here, such as to support heterodyne detection. The waveguides 108 route the captured or mixed optical signals through the waveguide layer 106 to the lenslets 202 and the antenna elements 204 of the pupil 102, which is the exit pupil of the photonic integrated circuit in this example. The path length matching devices 110 and/or the wavelength selection devices 112 may be used as needed or desired to provide desired path length matching and/or wavelength selection functionality, although these components are omitted from FIG. 8. The electronics layer 114 is also omitted from FIG. 8 but may be used here. The optical signals provided through the pupil 102 are received at a detector layer 804, which includes multiple detectors for sensing or measuring one or more characteristics of the optical signals. For instance, the detector layer 804 may represent a flat-panel multi-anode photomultiplier tube assembly, a collection of avalanche photodiodes, or other suitable optical detectors, which can generate image data representing the scene.

Although FIGS. 7 and 8 illustrate specific examples of photonic integrated circuit-based imaging systems, various changes may be made to FIGS. 7 and 8. For example, each imaging system 700, 800 may include any suitable number of lenslets 202, 202' and antenna elements 204, 204' in any suitable arrangement in the pupils 102, 104. Also, the imaging system 100 may be implemented in any other suitable manner.

Figure 9:
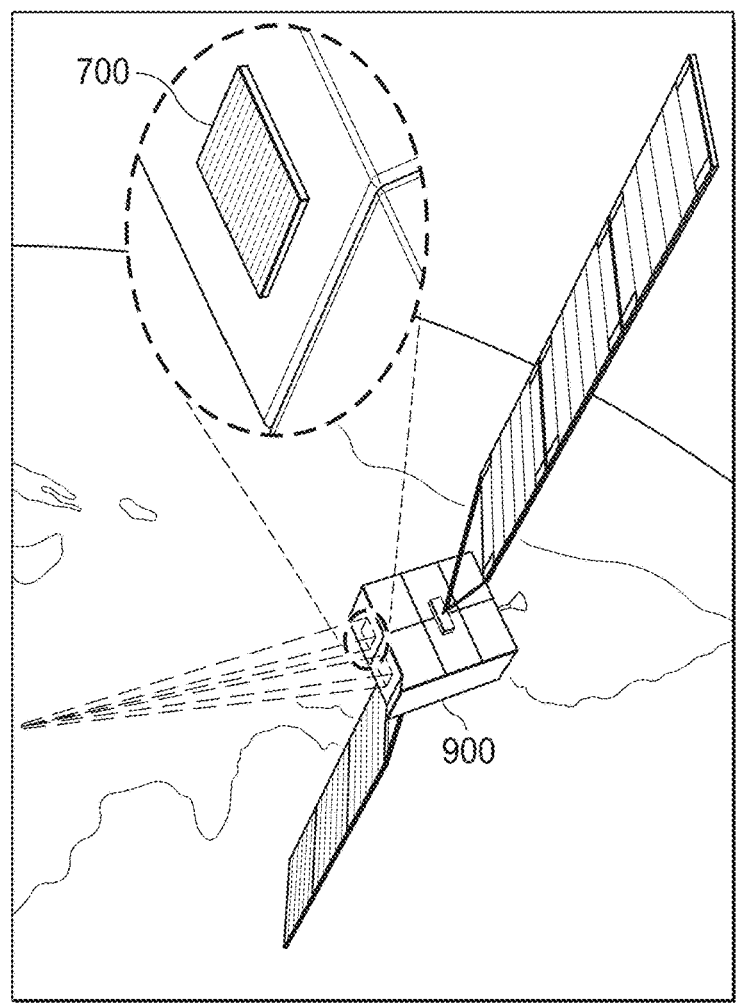
FIGS. 9 and 10 illustrate example applications for photonic integrated circuit-based imaging systems according to this disclosure.
Figure 10:
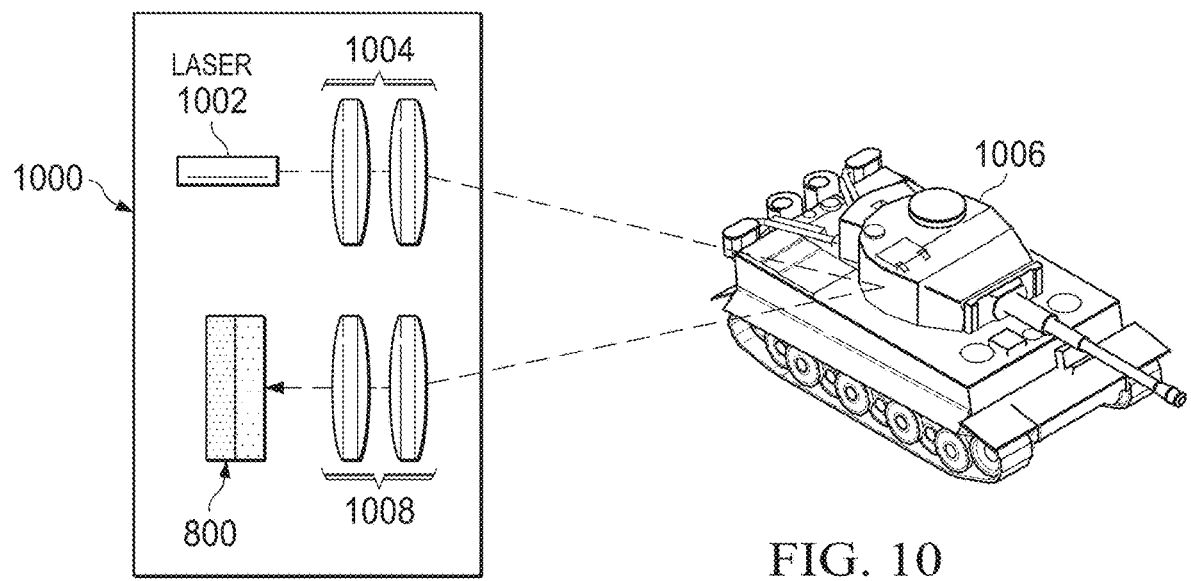

FIGS. 9 and 10 illustrate example applications for photonic integrated circuit-based imaging systems according to this disclosure. More specifically, FIG. 9 illustrates an example application of the passive imaging system 700, and FIG. 10 illustrates an example application of the LADAR imaging system 800. Note that these applications for photonic integrated circuit-based imaging systems represent two example applications of the photonic integrated circuit-based imaging systems 100, 700, 800. However, the photonic integrated circuit-based imaging systems 100, 700, 800 may be used in any other suitable manner.

As shown in FIG. 9, a satellite 900 or other vehicle may include one or more instances of the passive imaging system 700. The satellite 900 or other vehicle may use the one or more passive imaging systems 700 to capture images of various targets or areas of interest. In this specific example, the satellite 900 may use the one or more passive imaging systems 700 to capture images of various portions of the earth. For applications such as aerial or space-based vehicles, reducing the weight and volume of the one or more passive imaging systems 700 may be particularly useful since this can help meet various design requirements typically associated with aerial or space-based vehicles.

As shown in FIG. 10, a LADAR system 1000 includes at least one laser 1002, which can generate laser energy that is transmitted through one or more lenses or other optical devices 1004 towards at least one target or area of interest 1006. Laser energy reflected from the at least one target or area of interest 1006 can be received at the LADAR system 1000 and pass through one or more lenses or other optical devices 1008 before being provided to the LADAR imaging system 800. The imaging system 800 can use the captured laser energy to generate images of the target or area of interest 1006. Here, the imaging system 800 uses the smaller pupil 104 as the system focal surface, and the detector layer 804 is positioned on the larger pupil 102 of the imaging system 800. The LO source 116 may be used with the imaging system 800 in FIG. 10 to provide heterodyne detection as part of the LADAR system's functionality.

Although FIGS. 9 and 10 illustrate examples of applications for photonic integrated circuit-based imaging systems, various changes may be made to FIGS. 9 and 10. For example, each imaging system 100, 700, 800 may be used in any other suitable manner.

The following describes example embodiments of this disclosure that implement or relate to a photonic integrated circuit-based imaging system. However, other embodiments may be used in accordance with the teachings of this disclosure.

In a first embodiment, an apparatus includes a photonic integrated circuit having a first lenslet array and a first antenna element array forming a first pupil of the photonic integrated circuit and a second lenslet array and a second antenna element array forming a second pupil of the photonic integrated circuit, where the second pupil has a different size than the first pupil. The photonic integrated circuit also has a waveguide layer positioned between the first and second pupils, where the waveguide layer includes multiple waveguides configured to guide optical signals between antenna elements of the first antenna element array and antenna elements of the second antenna element array.

In a second embodiment, a method includes receiving optical signals at a first lenslet array and a first antenna element array forming a first pupil of a photonic integrated circuit. The method also includes transmitting the optical signals from a second lenslet array and a second antenna element array forming a second pupil of the photonic integrated circuit, where the second pupil has a different size than the first pupil. The method further includes guiding the optical signals between antenna elements of the first antenna element array and antenna elements of the second antenna element array using multiple waveguides of a waveguide layer positioned between the first and second pupils.

Any single one or any suitable combination of the following features may be used with the first or second embodiment. Each of at least one of the waveguides may be associated with a path length matching device, and each path length matching device may be configured to adjust an effective optical path length of the associated waveguide. Each of at least one of the waveguides may be associated with a wavelength selection device, and each wavelength selection device may be configured to control at least one wavelength of the optical signals flowing through the associated waveguide. The photonic integrated circuit may further include control electronics configured to control one or more operations of the photonic integrated circuit. The photonic integrated circuit may further include an LO source configured to generate one or more LO signals for combination with one or more of the optical signals. One or more imaging sensors may be configured to generate an image of a scene based on the optical signals received from one of the pupils. The one or more imaging sensors may include a focal plane assembly, the larger pupil may be configured to receive incoming optical signals from the scene, and the smaller pupil may be configured to provide outgoing optical signals to the focal plane assembly. The one or more imaging sensors may include multiple imaging sensors coupled directly to the larger pupil, the smaller pupil may be configured to receive incoming optical signals from the scene, and the larger pupil may be configured to provide outgoing optical signals to the multiple imaging sensors. The first lenslet array, first antenna element array, waveguide layer, second lenslet array, and second antenna element array may form at least part of a monolithic structure. The first lenslet array, first antenna element array, waveguide layer, second lenslet array, and second antenna element array may be formed using CMOS fabrication.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a photonic integrated circuit comprising:
a first lenslet array and a first antenna element array forming a first pupil of the photonic integrated circuit;
a second lenslet array and a second antenna element array forming a second pupil of the photonic integrated circuit, the second pupil having a different size than the first pupil;
a waveguide layer positioned between the first and second pupils, the waveguide layer comprising multiple waveguides configured to guide optical signals between antenna elements of the first antenna element array and antenna elements of the second antenna element array; and
an electronics layer configured to control operations of one or more devices within the waveguide layer, the second pupil positioned within an opening of the electronics layer.

2. The apparatus of claim 1, wherein:
the one or more devices within the waveguide layer include one or more path length matching devices; and
each of at least one of the waveguides is associated with one of the one or more path length matching devices, each path length matching device configured to adjust an effective optical path length of the associated waveguide.

3. The apparatus of claim 1, wherein the electronics layer comprises control electronics configured to control one or more operations of the photonic integrated circuit.

4. The apparatus of claim 1, wherein the one or more devices within the waveguide layer include a local oscillator (LO) source configured to generate one or more LO signals for combination with one or more of the optical signals.

5. The apparatus of claim 1, further comprising:
one or more imaging sensors configured to generate an image of a scene based on the optical signals received from one of the first and second pupils.

6. The apparatus of claim 5, wherein:
the one or more imaging sensors comprise a focal plane assembly;
the first pupil is larger than the second pupil;
the first pupil is configured to receive incoming optical signals from the scene; and
the second pupil is configured to provide outgoing optical signals to the focal plane assembly.

7. The apparatus of claim 5, wherein:
the one or more imaging sensors comprise multiple imaging sensors coupled directly to the first pupil;
the first pupil is larger than the second pupil;
the second pupil is configured to receive incoming optical signals from the scene; and
the first pupil is configured to provide outgoing optical signals to the multiple imaging sensors.

8. The apparatus of claim 1, wherein the first lenslet array, first antenna element array, waveguide layer, second lenslet array, and second antenna element array form at least part of a monolithic structure.

9. The apparatus of claim 1, wherein the first lenslet array, first antenna element array, waveguide layer, second lenslet array, and second antenna element array are formed using complementary metal oxide semiconductor (CMOS) fabrication.

10. An apparatus comprising:
a photonic integrated circuit comprising:
a first lenslet array and a first antenna element array forming a first pupil of the photonic integrated circuit;
a second lenslet array and a second antenna element array forming a second pupil of the photonic integrated circuit, the second pupil having a different size than the first pupil; and
a waveguide layer positioned between the first and second pupils, the waveguide layer comprising multiple waveguides configured to guide optical signals between antenna elements of the first antenna element array and antenna elements of the second antenna element array;
wherein each of at least one of the waveguides is associated with a wavelength selection device positioned along the associated waveguide within the waveguide layer, each wavelength selection device configured to control at least one wavelength of the optical signals flowing through the associated waveguide.

11. A method comprising:
receiving optical signals at a first lenslet array and a first antenna element array forming a first pupil of a photonic integrated circuit;
transmitting the optical signals from a second lenslet array and a second antenna element array forming a second pupil of the photonic integrated circuit, the second pupil having a different size than the first pupil;
guiding the optical signals between antenna elements of the first antenna element array and antenna elements of the second antenna element array using multiple waveguides of a waveguide layer positioned between the first and second pupils; and
controlling operations of one or more devices within the waveguide layer using an electronics layer, the second pupil positioned within an opening of the electronics layer.

12. The method of claim 11, wherein:
the one or more devices within the waveguide layer include one or more path length matching devices;
each of at least one of the waveguides is associated with one of the one or more path length matching devices; and
the method further comprises using the path length matching device associated with one of the waveguides to adjust an effective optical path length of the associated waveguide.

13. The method of claim 11, wherein:
the one or more devices within the waveguide layer include one or more wavelength selection devices;
each of at least one of the waveguides is associated with one of the one or more wavelength selection devices; and
the method further comprises using the wavelength selection device associated with one of the waveguides to control at least one wavelength of the optical signals flowing through the associated waveguide.

14. The method of claim 11, further comprising:
using control electronics of the electronics layer to control one or more operations of the photonic integrated circuit.

15. The method of claim 11, further comprising:
generating one or more local oscillator (LO) signals on the photonic integrated circuit for combination with one or more of the optical signals.

16. The method of claim 11, further comprising:
generating an image of a scene using one or more imaging sensors based on the optical signals received from the second pupil.

17. The method of claim 16, wherein:
the one or more imaging sensors comprise a focal plane assembly;
the first pupil is larger than the second pupil;
the first pupil receives incoming optical signals from the scene; and
the second pupil provides outgoing optical signals to the focal plane assembly.

18. The method of claim 16, wherein:
the one or more imaging sensors comprise multiple imaging sensors coupled directly to the first pupil;
the second pupil is larger than the first pupil;
the first pupil receives incoming optical signals from the scene; and
the second pupil provides outgoing optical signals to the multiple imaging sensors.

19. The method of claim 11, wherein the first lenslet array, first antenna element array, waveguide layer, second lenslet array, and second antenna element array form at least part of a monolithic structure.

20. The method of claim 11, wherein the first lenslet array, first antenna element array, waveguide layer, second lenslet array, and second antenna element array are formed using complementary metal oxide semiconductor (CMOS) fabrication.

* * * * *